US006052792A

United States Patent [19]
Mensch, Jr.

[11] Patent Number: 6,052,792
[45] Date of Patent: Apr. 18, 2000

[54] POWER MANAGEMENT AND PROGRAM EXECUTION LOCATION MANAGEMENT SYSTEM FOR CMOS MICROCOMPUTER

[76] Inventor: William D. Mensch, Jr., 1924 E. Hope St., Mesa, Ariz. 85203

[21] Appl. No.: 08/694,094

[22] Filed: Aug. 8, 1996

Related U.S. Application Data

[60] Continuation-in-part of application No. 08/401,885, Mar. 10, 1995, Pat. No. 5,737,613, which is a division of application No. 08/111,379, Aug. 24, 1993, Pat. No. 5,438,681.

[51] Int. Cl.[7] ....................................................... G06F 1/32
[52] U.S. Cl. ............................................................ 713/322
[58] Field of Search ......................... 395/750.03–750.08, 395/182.03, 800.37; 711/1, 158; 712/37; 713/300–340

[56] References Cited

U.S. PATENT DOCUMENTS

| | | | |
|---|---|---|---|
| 4,448,543 | 5/1984 | Vail | 368/202 |
| 4,542,453 | 9/1985 | Patrick et al. | 714/8 |
| 4,802,119 | 1/1989 | Heene et al. | 714/7 |
| 5,123,107 | 6/1992 | Mensch, Jr. | 395/800 |
| 5,254,888 | 10/1993 | Lee et al. | 327/298 |
| 5,319,771 | 6/1994 | Takeda | 395/550 |
| 5,564,042 | 10/1996 | Ventrone et al. | 395/556 |
| 5,737,613 | 4/1998 | Mensch, Jr. | 395/750.04 |

OTHER PUBLICATIONS

"The Information Solution . . . the city in the palm of your hand", brochure for InfoPak Directory Plus ™ and Metro-Card ™.

"Portable multiple–listing data", The Arizona Republic, Business Computing, Monday, Feb. 6, 1995.

"Device does volume business", The Phoenix Gazette, Business, Tuesday, Dec. 28, 1993.

Advertisement for the MetroCard, New Times, Sept. 22–28, 1994, p. 28.

*Primary Examiner*—John A. Follansbee
*Attorney, Agent, or Firm*—Cahill, Sutton & Thomas P.L.C.

[57] ABSTRACT

A monitor program stored in a ROM of a microcomputer chip of a computer is operated both to (1) save power by disabling all external buses, turning off power to a communication port, deselecting all external memory devices, and turning off a fast clock oscillator and clocking all operations of the microcomputer chip at a slow second frequency, and also to (2) prioritize execution of a plurality of application programs located in external memory devices and/or internal memory of the microcomputer chip while also relying on the monitor program to effectuate normal initialization procedures. The monitor program also allows efficient access to slow external memory devices by dividing down the fast clock rate produced by the oscillator to a slower rate and accessing the slow memory at the slower rate, thereby saving power.

27 Claims, 9 Drawing Sheets

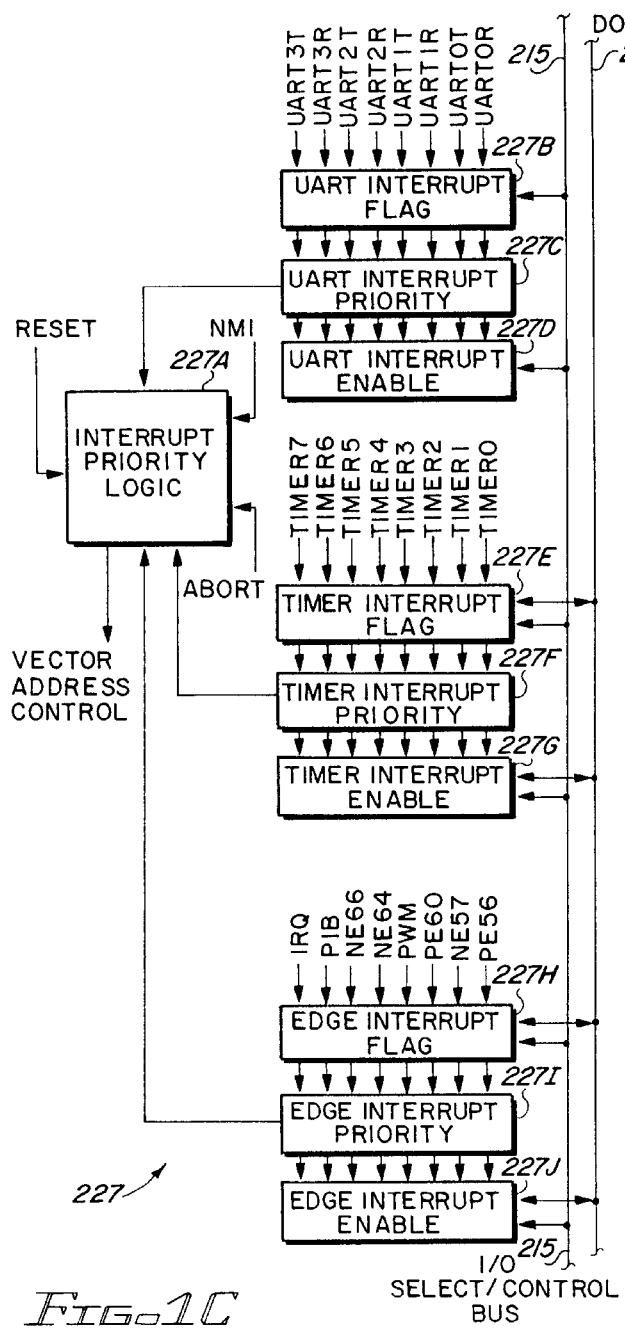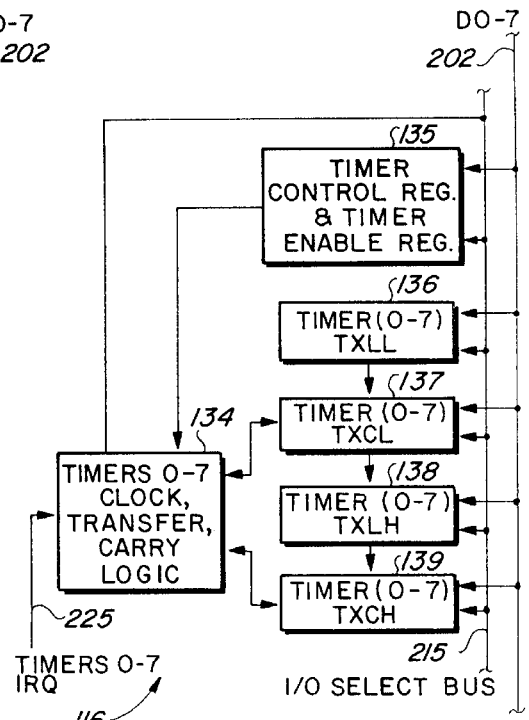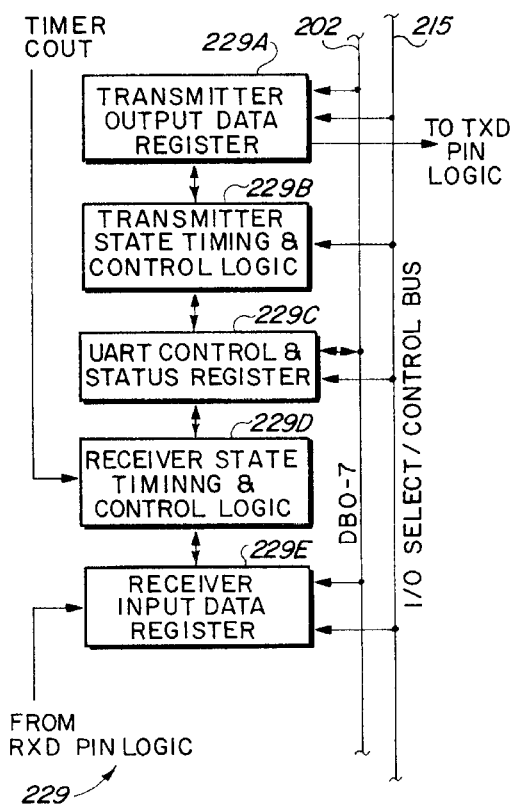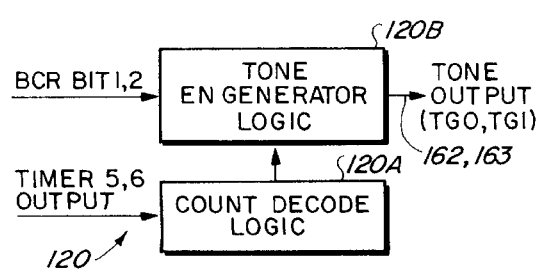

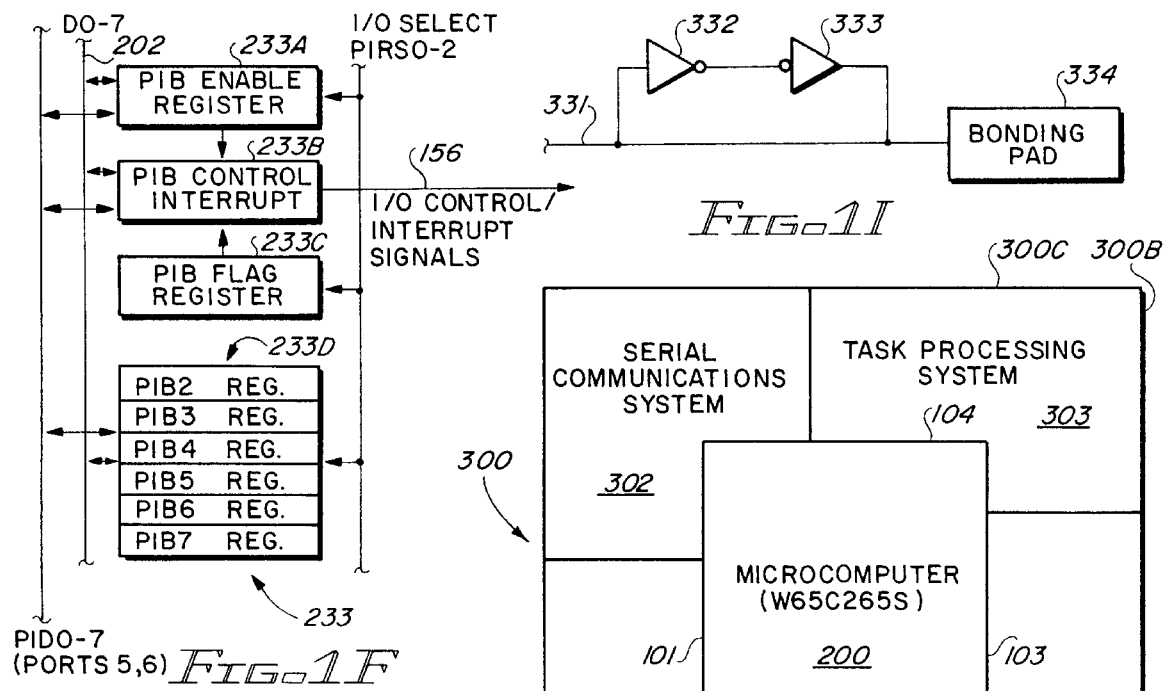
FIG. 1F
FIG. 1I
FIG. 3A
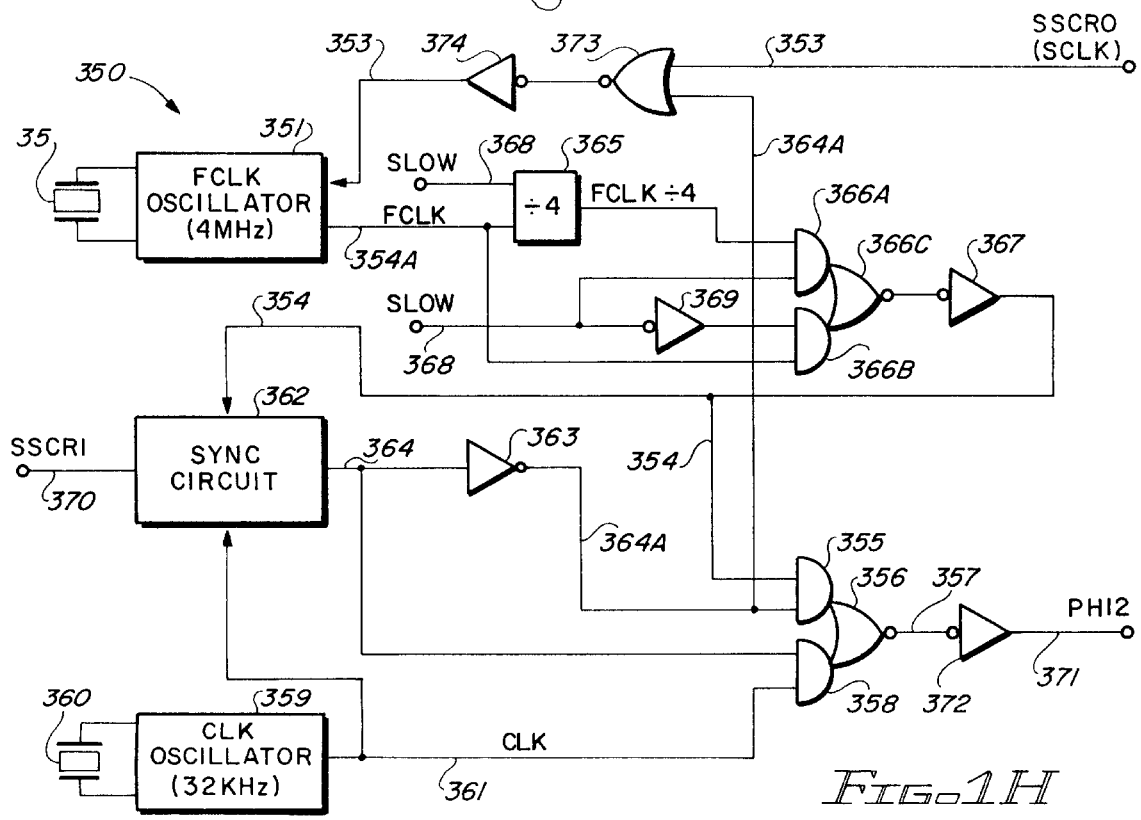
FIG. 1H

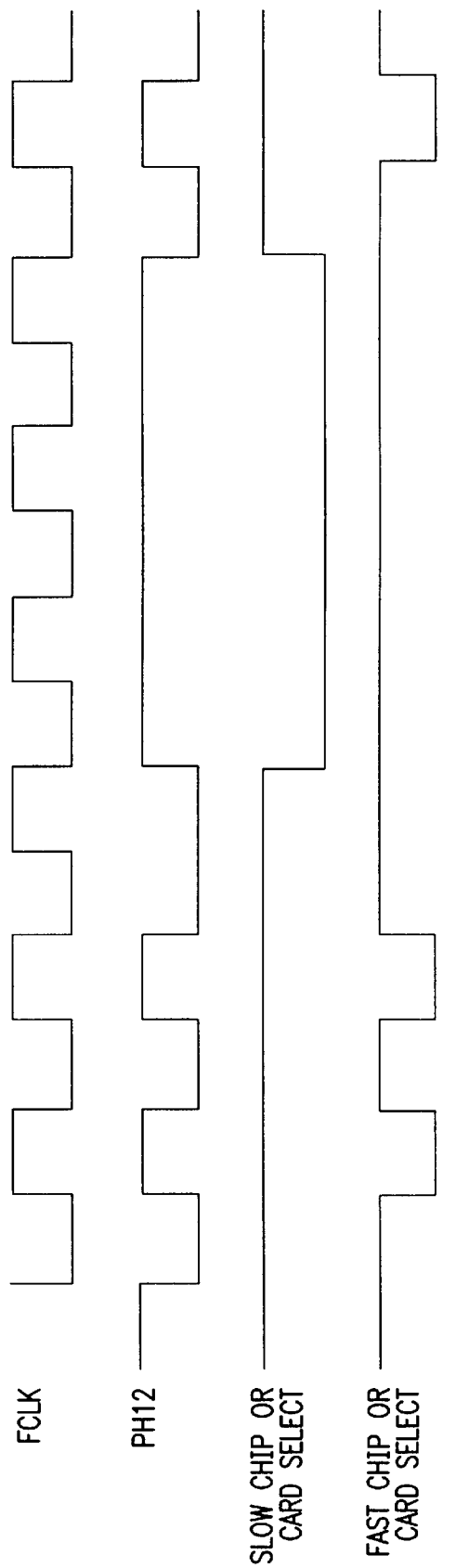

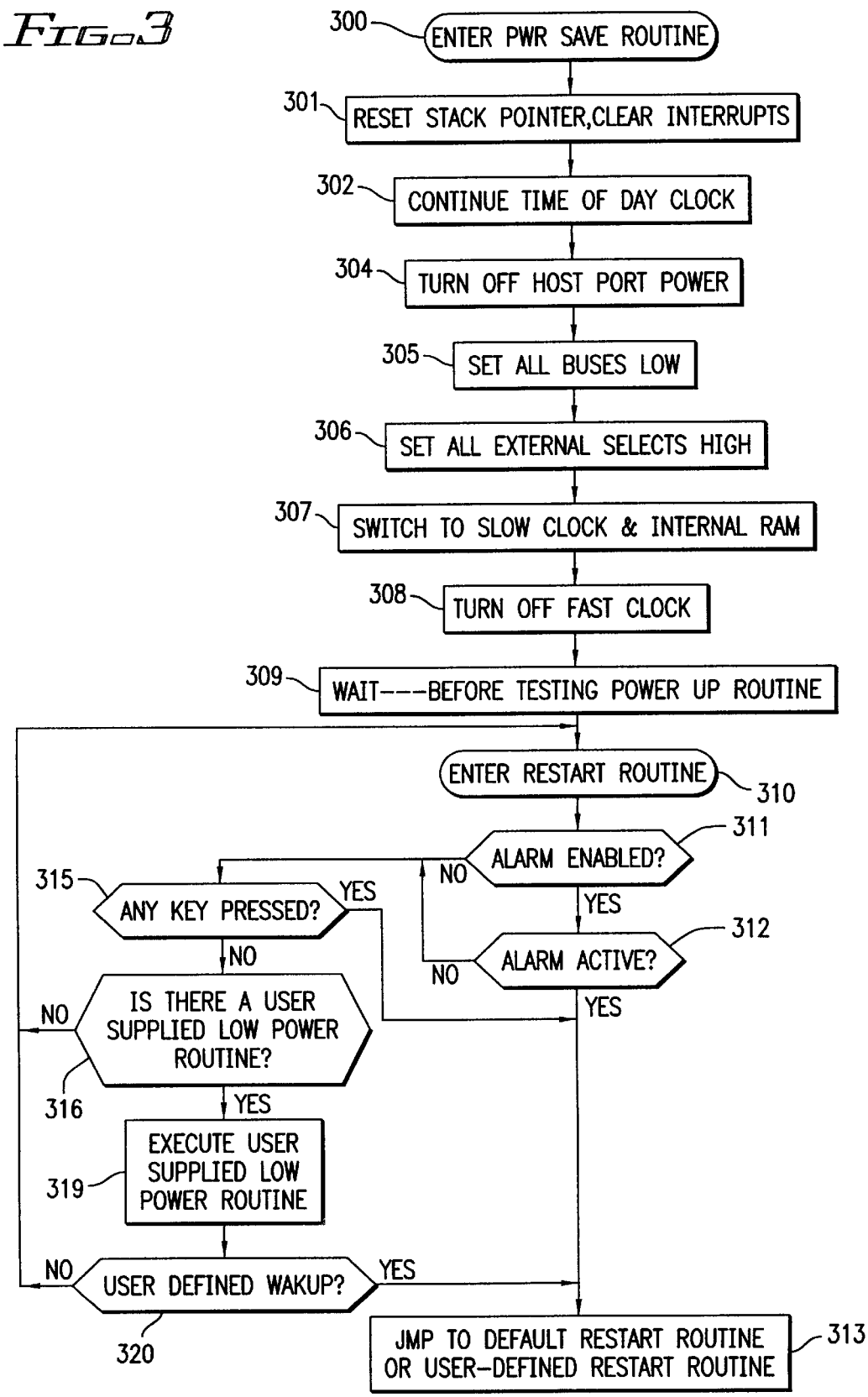

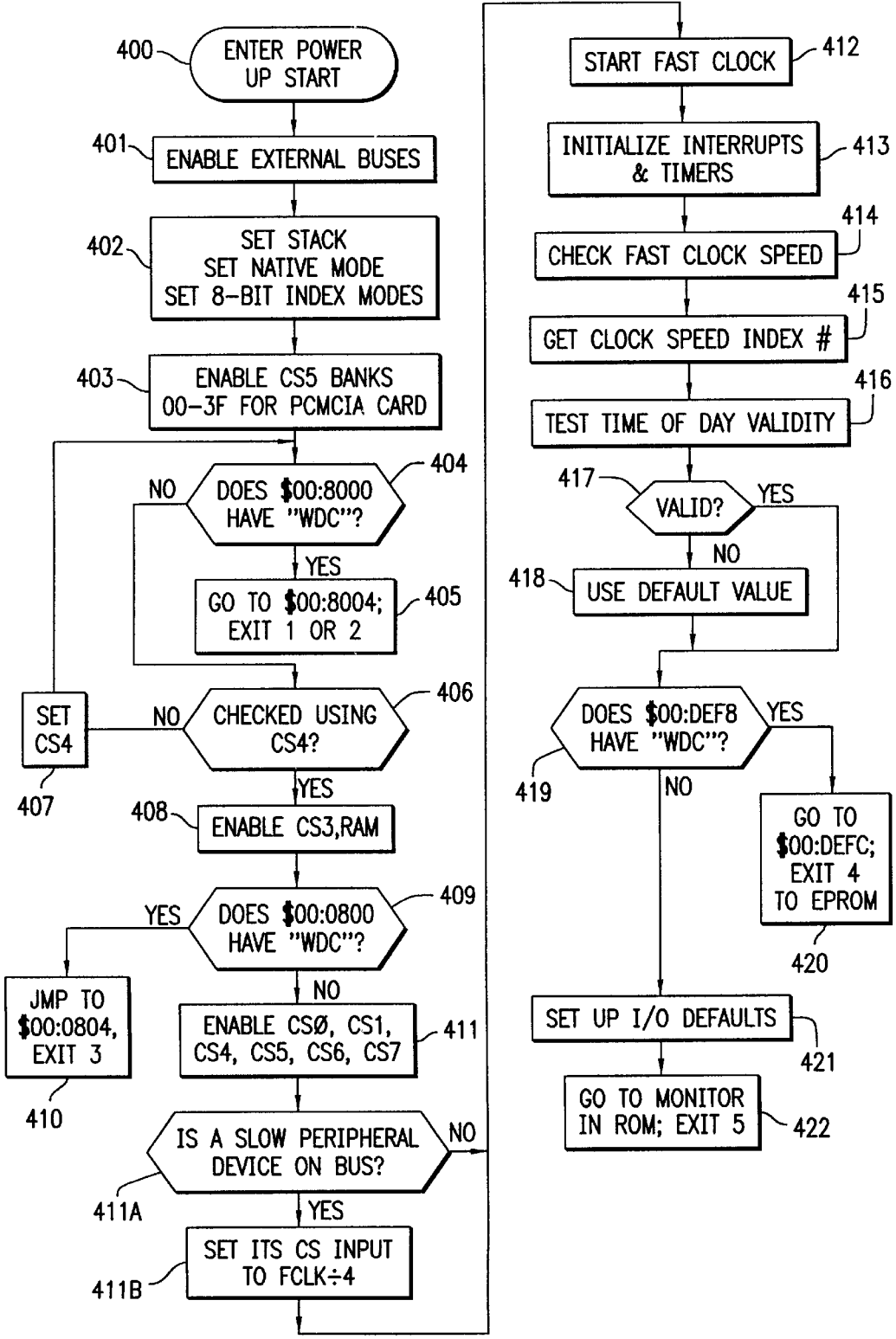

POWER MANAGEMENT AND PROGRAM EXECUTION LOCATION MANAGEMENT SYSTEM FOR CMOS MICROCOMPUTER

CROSS REFERENCE TO RELATED APPLICATION

This application is a continuation-in-part of my patent application "TOPOGRAPHY FOR CMOS MICROCOMPUTER", Ser. No. 08/401,885, filed Mar. 10, 1995 and issued as U.S. Pat No. 5,737,613 on Apr. 7, 1998, which is a division of Ser. No. 08/111,379, filed Aug. 24, 1993, entitled "TOPOGRAPHY FOR CMOS MICROCOMPUTER" and which issued into U.S. Pat. No. 5,438,681, on Aug. 1, 1995, and which is incorporated herein by reference. (The subject matter described with reference to FIGS. 3 and 4 has been added.)

REFERENCE TO MICROFICHE APPENDIX

A microfiche appendix (Appendix A) containing a total of 5 sheets and 299 frames of microfiche is included in this application.

BACKGROUND OF THE INVENTION

The invention relates to a system for (1) speed control circuitry allowing the microprocessor access to both fast and slow memories and I/O interface to effectuate automatic reduction of overall system power and (2) determining program execution location.

Microprocessors generally contain an internal address bus, an internal data bus, a number of registers including an accumulator, a program counter, an internal data latch, stack pointer registers, index registers, an arithmetic logic unit, an instruction register, a status register, instruction decoding circuitry, register transfer logic, and data buffer latches and address latches. Microprocessors do not ordinarily contain additional components that are needed in a microcomputer system, such as a read only memory for storing programs, a random access memory for storing variables and data, timers, UARTs, I/O functions, priority interrupt systems and the like. However, with the wide availability and commercial success of quite a number of microprocessors, various suppliers have begun using commercially available microprocessor designs as "embedded" cores of larger microcontrollers or microcomputers on single silicon chips that include not only the microprocessor, but also some or all of the above-mentioned components and other components.

Occasionally, it is desirable to provide a PCMCIA card or an EPROM which includes a complete application program and to have execution of the program controlled entirely by such PCMCIA card or EPROM. In one prior art device marketed by Infopak, Inc. of Phoenix, Ariz., application programs were stored in a PCMCIA card. The PCMCIA card constituted the memory of the microprocessor, which was a W65816 with no on-chip ROM so the PCMCIA card had to be plugged in before the computer could be powered up. Therefore, the entire application was automatically executed "in place" under the control of the PCMCIA card. However, that system allows no selection of the relative priorities of executing various applications that may be stored in various memories or sections of memory in the computer system. The computer into which such PCMCIA card is inserted becomes, in effect, an inflexible, dedicated computer as long as the PCMCIA card is plugged in and can perform no other function than to execute the program stored in the PCMCIA card.

In some applications of a microcomputer it may be desirable to access off-chip memory, such as slow EPROM, SRAM or DRAM and fast on-chip SRAM and SROM. It would be very desirable for the entire microcomputer to be able to automatically operate at various fast and slow speeds while accessing various on-chip and off-chip memories and/or peripheral devices, because many applications of microcomputers require use of battery power, and consequently it would be very desirable for microcomputers used in such applications to be able to automatically minimize the system power consumption according to the demands of the program or routines currently being executed. Conventional computers continue to operate at a fast cycle rate during a slow memory access, using wait states or the like to effectuate accessing of slower blocks of memory to allow the processor to continue to perform functions.

The closest prior art known to me includes the above-mentioned Infopak system and the W65C134S microcontroller which is fully described in U.S. Pat. No. 5,123,107. I designed and now market the W65C134S microcontroller through my company, The Western Design Center, Inc. of Mesa, Ariz.

There is a presently unmet need for a more powerful microcomputer chip that can operate with lower power consumption than previously has been practical. There also is a presently unmet need for a low cost computer that is able to allow easy prioritization of "in-place" execution of a plurality of programs in various memory devices on the basis of permanent instructions resident in the microcomputer chip.

SUMMARY OF THE INVENTION

Accordingly, it is an object of invention to provide a microcomputer chip that is capable of automatically switching between high and very low dynamic power levels and also is able to operate at high speeds.

It is another object of the invention to provide a computer in which a monitor program stored in a microcomputer chip thereof has the capability of prioritizing the execution of application programs stored in one or more off-chip EPROMS and/or PCMCIA cards plugged into the computer.

It is another object of the invention to provide a microcomputer that is capable not only of serving as a "core" of a larger microcomputer system, but also is able to function as a "master", rather than a "slave" to the larger microcomputer system.

It is another object of the invention to provide a microcomputer chip that has the capability of efficiently accessing internal and external memory and peripheral devices having substantially different speeds.

It is another object of the invention to provide a microcomputer having the capability of greatly reducing power consumption under software control.

It is another object of the invention to provide a low cost computer which is especially efficient for text-based communication via the "net" or world-wide web.

Briefly described, and in accordance with one embodiment thereof, the invention provides a system and method for operating a computer including a microcomputer chip to reduce power dissipation and/or a system and method to prioritize execution of a plurality of stored programs, including a first program and a second program. In the described embodiment, a main clock signal (PHI2) is produced in response to a fast first clock signal (FCLK) having a fast first frequency. A time-of-day clock is operated in response to a continuous second clock signal (CLK) having a slow second frequency. Power is supplied to a first I/O port for serial communication to, for example, a host computer or a printer. A determination is made as to whether low standby power operation is needed, usually in response to an interrupt input line. After determination is made that low power standby operation is needed, the power saving routine of a monitor program stored in a ROM of the microcomputer chip is entered. The time-of-day clock continues to operate in response to the continuous second clock signal. The power saving routine is executed to apply deselect signals to each of a plurality of chip select outputs of the microcomputer chip and to deactivate one of the peripheral devices on the computer bus. The power saving routine switches the frequency of the main clock signal (PHI2) to the slow second frequency and, after a settling, turns off a fast oscillator circuit that produces the fast first clock signal (FCLK). The power saving routine then enters into a loop that determines when a power-up operation is needed by servicing an interrupt, such as a keyboard interrupt or a baud rate generator timer interrupt, still operating at the slow second frequency, and then enables the external bus or buses. The monitor program then checks the first address in a first memory device in or coupled to the computer to determine if an indicator is present at the first address. If the indicator is present at the first address, the monitor then causes a first program stored in the first memory at a location pointed to by a pointer stored at the first address to be executed. If the indicator is not present at the first address, the monitor program causes a second address in a second memory device in or coupled to the computer to determine if the indicator is present at the second address, and if it is, then the monitor program causes a second program at a location pointed to by a pointer stored in the second address to be executed. In the described embodiment, the power saving routine turns on the fast oscillator circuit and switches the frequency of the main clock signal (PHI2) back to the fast first frequency (FCLK) if the indicator is not present at the first address or the second address. If the indicator is present at the first address or the second address, the one of the first and second programs that is executed may or may not switch the frequency of the main clock signal (PHI2). Before the fast oscillator circuit is turned back on, a determination is made as to whether a slow memory device, such as an EPROM or PCMCIA card is coupled to or in the microcomputer, and if that is the case, the fast first clock signal (FCLK) is divided down to produce a lower third clock signal, which then can be used either to determine the frequency of the main clock signal (PHI2) or to determine if the frequency of a chip select output coupled to the slow memory device of the main clock signal operates at the fast first frequency (FCLK). In the described embodiment of the invention, the power saving routine can turn off the power supplied to the first I/O port. The deselect signals can disable all external memory devices coupled to the microcomputer chip. If the indicator is present at either of the first and second addresses, a user-supplied power saving routine can be executed to determine how return to full power, high speed operation is effectuated.

BRIEF DESCRIPTION OF THE DRAWINGS

FIGS. 1C–1J are detailed logic diagrams of various blocks in FIGS. 1 and 1A.

FIG. 1J is a timing diagram useful in explaining automatic slowing of the system clock frequency to effectuate accessing a slow memory and to reduce chip power dissipation.

FIG. 3 is a flow diagram of a portion of a monitor program stored in the on-board ROM of the microcomputer chip of FIGS. 1A and 1B and 2, dedicated to controlling the power dissipation thereof.

FIG. 4 is a flow diagram of a portion of the monitor program stored in the on-board ROM for determining if/when off-board program execution is needed and for effectuating switching to off-board execution of a program in a PCMCIA model.

DETAILED DESCRIPTION OF THE PREFERRED EMBODIMENT

Figure 1A:
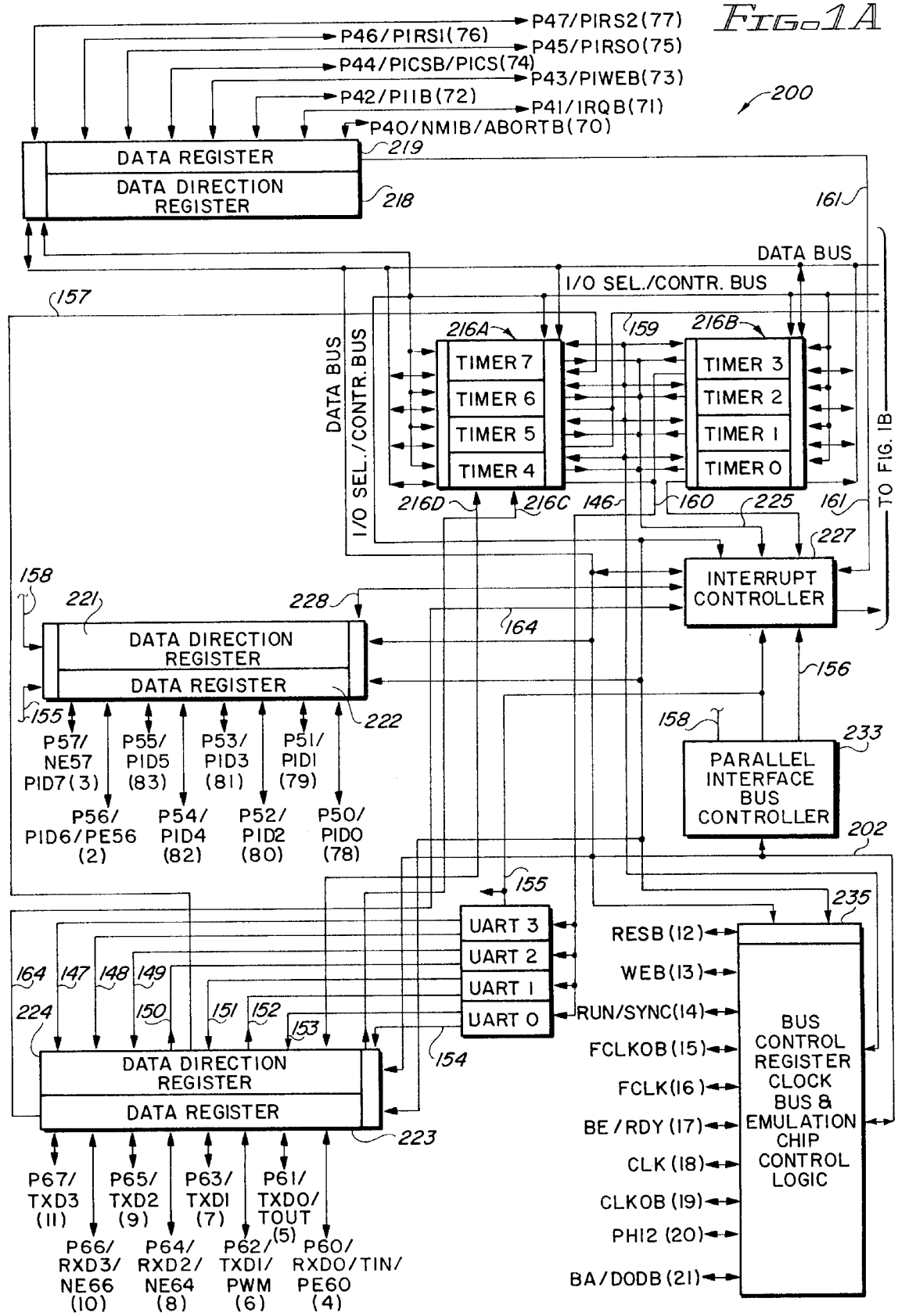
FIGS. 1A and 1B constitute a block diagram showing the architecture of the microcomputer of the present invention.
Figure 1B:
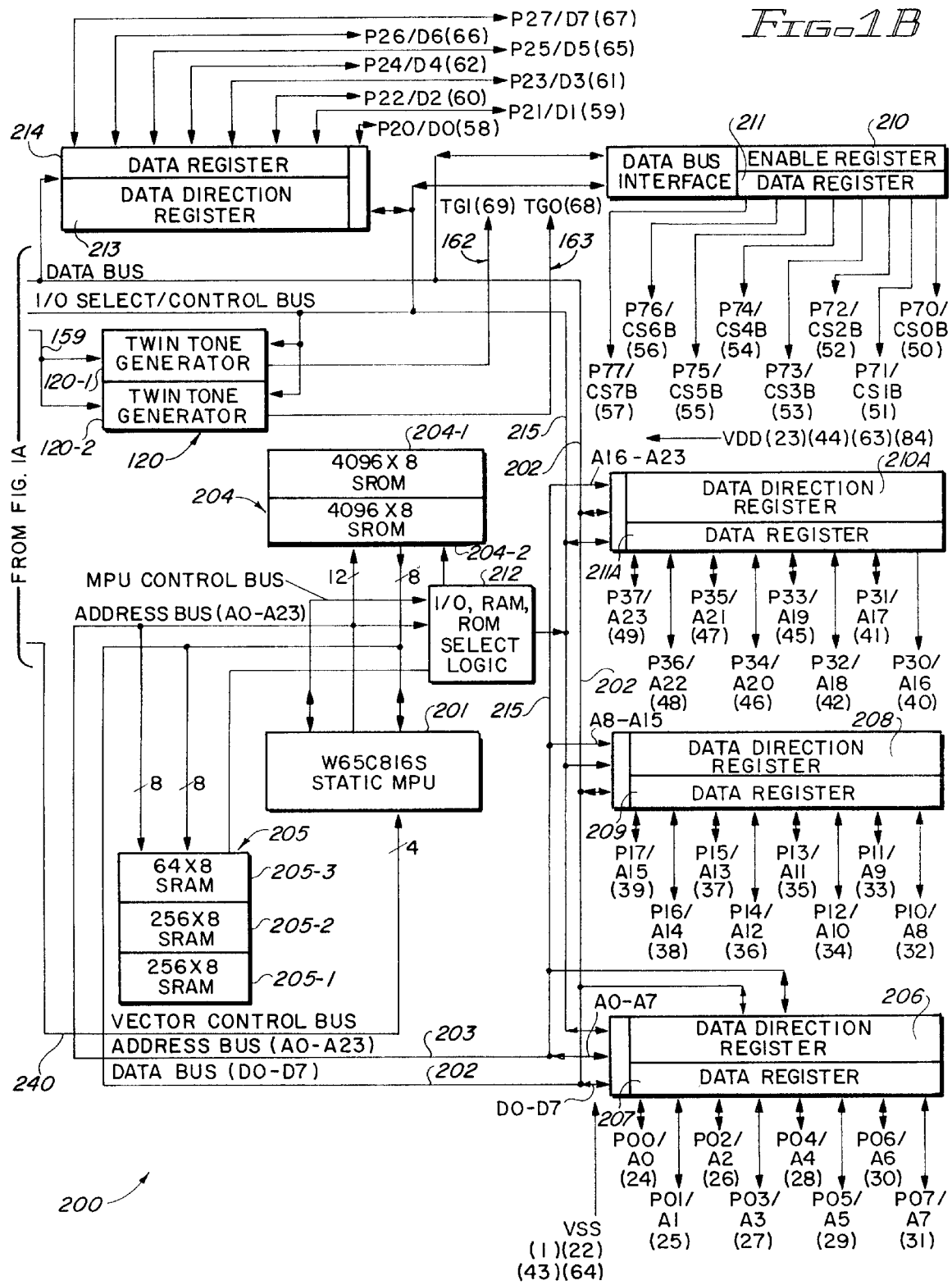

Before describing the management of power dissipation and management of the priority of on-board and off-board program execution according to this invention with reference to FIGS. 3 and 4, it will be helpful to describe the overall physical structure of the CMOS microcomputer of FIGS. 1A and 1B. The block diagram of FIGS. 1A and 1B shows a single chip CMOS microcomputer 200 that includes a microprocessor 201, two 256 word by eight bit and one 64 word by eight static RAMs (SRAMs) 205, two 4096 word by eight bit static ROMs (SROMs) 204, and I/O, RAM, and ROM select logic 212. Microcomputer 200 also includes data register 207 and data direction register 206 for Port 0 I/O terminals P00–P07, and address latches for address bus outputs A0–A7. Note that most of the leads of microprocessor 200 have two or three signals multiplexed thereon. In the drawings, slashes (/) separate the names of signals multiplexed onto a particular lead. The pin numbers of the leads are indicated in parentheses. Accordingly, a particular lead will be referred to by the name of the particular signal presently being discussed.

Data register 209 and data direction register 208 are provided for Port 1 I/O leads P10–P17, and address latches are provided for address outputs A8–A15. Enable register 210 and data register 211 are provided for Port 7 outputs P70–P77, and latches are provided for chip select outputs CS0–CS7. Data direction register 213 and data register 214 are provided for Port 2 I/O conductors P20–P27, and data input/output latches are provided for data bus conductors D0–D7.

Data Direction Register 210A and a Data Register 211A are provided for Port 3 outputs P30–P37 and address outputs A16–A23.

Microcomputer 200 also includes data direction register 218 and Data Register 219 for I/O Port 4 conductors P40–P47, and input buffers for the signals NMIB, ABORTB, IRQB, PIIB, PIWEB, PICSB, PICS, PIRS0, PIRS1, and PIRS2. (Note that the concluding letters "B" on signal names herein represent logical complements; eg. NMIB means $\overline{NMI}$.) Data direction register 221 and data register 222 are coupled to Port 5 I/O conductors P50–P57, input buffers are provided for edge-sensitive interrupt inputs PE56 and NE57, and parallel interface bus PID0–PID7.

Microcomputer chip 200 also includes four universal asynchronous receiver transmitters (UARTs) 229. Block 235 includes a bus control register, clock circuitry, bus control circuits, and de-bug control logic circuitry. Block 235 is connected to conductors of the signals RESB, WEB, RUN/SYNC, FCLK0, FCLK, BE/RDY, CLK, CLK0, PHI2, and a conductor 146 that also is connected to Timers 0–7. Microcomputer 200 further includes a parallel interface bus controller (PIB) circuit 233, interrupt controller circuitry 227, and blocks 216A and 216B containing eight Timers 0–7.

Eight bit data bus 202 is connected to microprocessor 201, SRAM 205, SROM 204, all of the data direction registers, all of the timers, interrupt controller 227, UARTs 229, chip control logic 235, and timers 0–7. Address bus 203 is connected to data direction registers 206, 208, and 210A, to SRAM 205, SROM 204, and I/O, RAM, ROM select logic 212. I/O Control Bus 215 (which also includes address bits A0–A3), RESET, WEB, PHI2, and decoded 16 byte memory block select signals, is connected to I/O, RAM, ROM select logic in block 212, to all of the data and direction registers, and to chip control logic block 235. Note that all of the data and data direction register circuits in FIG. 1 include interface circuitry to control and connect the data and data direction registers to the data bus and various other conductors.

Interrupt controller 227 is connected by conductors 228 to data direction register 221, by vector control bus 240 to microprocessor 201, by conductor 164 to Data Register 223, and by conductor 161 to Data Register 219. Interrupt controller 227 also is connected by data bus 202 to all of the data direction registers, UARTs 229, to chip control block 235, by conductors 225 to Timers 0–7, by conductors 227B to microprocessor 201, and by conductors 156 to parallel interface bus controller 233. Parallel interface bus controller 233 is connected by conductors 158 to port 5 data direction register 221. Parallel interface bus controller 233 also is connected by conductor 155 to interrupt controller 227, UART 3, and data register 222.

Microprocessor 201 is identical to a W65C816S CMOS microprocessor marketed by the Western Design Center, Inc. of Mesa, Ariz. The structure and topography of the W65C618S microprocessor are described in detail in my U.S. Pat. No. 4,739,475, filed Nov. 28, 1984, issued on Apr. 19, 1988, entitled "Topography for Sixteen Bit CMOS Microprocessor with Eight Bit Emulation and Abort Capability", incorporated herein by reference.

Microcomputer chip 200 is the W65C265S recently introduced by the Western Design Center, Inc., of Mesa, Ariz. It is fabricated on a single chip, composed entirely of CMOS circuitry, and packaged in an 84 lead package or chip carrier Microcomputer 200 also can be used as the "core" 200A of a larger microcomputer system 300 that is implemented on a single silicon chip.

Before describing the topography of microcomputer 200, its main functional blocks will be described, and the functions of various package leads 1–84 also will be described.

8192 byte ROM 204 contains user program instructions and fixed constants which are mask-programmed into SROM 204 during fabrication. 576 byte SRAM 205 contains the user program stack and also is used as a scratch pad memory during system operations.

A bus control register in block 235 controls various modes of I/O (input/output) and external memory interface. The voltage of the BE/RDY lead (17) during power-up determines the initial values of bits in the bus control register (BCR) to set up microcomputer 200 for de-bug or test modes, if desired. Bit 0 of the bus control register determines if the leads of I/O ports 0, 1, 2, and 3 are to function as I/O port leads or as address bus and data bus leads for external memory or external I/O access. The edge interrupt enable register and the edge interrupt flag register contain the enable bit and the flag bit associated with the edge interrupt inputs PE56, NE57, PE60, PWM (pulse width measurement), NE64, NE66, PIB interrupt, and IRQ level interrupt signals.

Referring to FIG. 1C, interrupt flag registers in interrupt controller 227 contain a bit which is set in response to a signal from a source. A read from an interrupt flag register transfers its value to the internal data bus 202. A write of a "1" to any bit of the internal flag registers clears that bit. If more than one bit of an interrupt flag register is set and enabled, a vector corresponding to the highest bit number set is used to thereby establish interrupt priority. Interrupt registers in block 227, when read, output their contents onto the internal data bus 202. Writing an interrupt enable register in block 227 writes a value from the internal data bus 202 into the interrupt enable register. Setting a bit in an interrupt enable register to a "1" permits the corresponding bit in the interrupt flag register to interrupt microprocessor 201.

As shown in FIG. 1C, interrupt controller 227 includes priority logic 227A connected to receive the RESET, timer interrupt priority signals, edge interrupt priority signals, and UART interrupt priority signals. Priority logic 227A receives the NMI and ABORT signals and the vector address control signals. The UART interrupt flag signals are received by interrupt flag register 227B, which controls interrupt priority circuit 227C, as does UART interrupt enable circuit 227D. Timer interrupt flag register 227E is connected to Timers 0–7, and controls timer interrupt priority logic 227F in response to that and timer interrupt circuit 227G. Edge interrupt priority circuit 227I responds to edge interrupt flag register 227H and edge interrupt enable register 227J to generate the edge interrupt priority signals.

The functions of timers 0–7 are as follows: Timer T0 functions as a monitor watchdog timer. Timer T1 functions as a time of day timer. Timer T2 provides a pre-scaled (with respect to time) interrupt function. Timer T3 controls the UART baud rate. Timer 4 controls both setting of the UART baud rate and timing of pulses on lead P60 through conductor 216C or generation of a pulse on P61 through conductor 216D. Timers T5 and T6 control the tone generators. Timer T7 controls the pulse width measurement (PWM) function from lead P62 through conductor 216C.

FIG. 1D shows the timer circuits 216, which include clock, transfer and carry logic 134 that responds to the timer IRQ signals and timer control register 135. Circuitry 134 also is coupled to the timer TXCH circuit 139 and timer TXCL circuit 137 and to the I/O control bus 215. The I/O control bus 215 is connected to blocks 135, 136, 137, 138, and 139. I/O control bus 215 and data bus 202 are connected to blocks 135–139.

Each of the UARTs 229 is a conventional full duplex universal asynchronous receiver/transmitter with programmable bit rates. A block diagram is shown in FIG. 1E. Each UART includes a transmitter output data register 229A, a transmitter timing and control circuit 229B, a UART status and control register 229C, a receiver timing and control circuit 229D, and a receiver input data register 229E. Its serial input and output functions are controlled by the asynchronous control and status register (ACSR) 229C of FIG. 1F. The serial bit rate of UART 229 is determined by Timer 3 or 4.

The parallel interface bus circuit 233, shown in FIG. 1F, is intended for inter-chip communications in parallel "task" processing applications, such as display control. The parallel interface bus (PIB) circuit 233 has a PIB Enable register 233A connected to the I/O select PIRS 0–2 conductors, data bus conductors D1–7, PID 0–7 conductors of port 5 and 6, and PIB control interrupt circuit 233B. PIB Flag register 233C associated with its use, also is connected to the PID 0–7 conductors, the I/O select PIRS 0–2 conductors, the D0–7 conductors, and PIB control interrupt circuit 223B, which generates I/O control/interrupt signals in response to the PIB enable and flag registers. PIB circuit 233 also includes six registers 233D coupled to data bus 202, to PIRS 0–2 register select conductors, and the PID 0–7 data conductors coupled to Ports 5 and 6. Parallel bus handshaking is controlled in response to the I/O control interrupt signals 150.

Each of tone generators 120-1 and 120-2 has the configuration 120 shown in FIG. 1G, including a count decode circuit 120A responsive to the Timer 5 or 6 output so as to control tone generator logic 120B, which is enabled by BCR bit 1 or 2 to produce a tone output on conductor 162 or 163.

Table 1 below lists the package lead numbers 1–84 of microcomputer 200, and identifies the one, two, or three signals multiplexed onto each of package leads 1–84, and also identifies the bit of the bus control register, asynchronous control and status register, etc. which determines which of the two or three identified signals is in effect. "BCRx" refers to bit x in the bus control register. "ACSRx" refers to bit x in the asynchronous control and status register 229C of FIG. 1F. "TCRx" refers to bit x in the timer control register. "PCSx" refers to bit x of the programmable chip select register in block 210 of FIGS. 1A and 1B. The PCSx bit determines whether package leads 37–44 function as programmed outputs or chip select outputs.

TABLE 1

| Pin | Name | Control Bit | Signal with Control Bit = 0 | Signal with Control Bit = 1 |
|---|---|---|---|---|
| 1 | VSS | — | VSS | VSS |
| 2 | P56/PE56/PID6 | BCR4 PIBER0 | P56 | PE56 PID6 |
| 3 | P57/NE57/PID7 | BCR4 PIBER0 | P57 | NE57 PID7 |
| 4 | P60/RXD0/TIN | ACSR05 TCR1 | P60 | RXD0 TIN |
| 5 | P61/TXD0/TOUT | ACSR00 TCR0 | P61 | TXD0 TOUT |
| 6 | P62/RXD1/PWM | ACSR15 TCR2 + TCR3 | P62 | RXD1 PWM |
| 7 | P63/TXD1/TOUT | ACSR10 | P63 | TXD1 TOUT |
| 8 | P64/RXD2 | ACSR25 | P64 | RXD2 |
| 9 | P65/TXD2 | ACSR20 | P65 | TXD2 |
| 10 | P66/RXD3 | ACSR35 | P66 | RXD3 |
| 11 | P67/TXD3 | ACSR30 | P67 | TXD3 |
| 12 | RESB | — | RESB | RESB |
| 13 | WEB | — | WEB | WEB |
| 14 | RUN/SYNC | BCR3 | RUN | RUN/SYNC |
| 15 | FCLKOB | — | FCLKOB | FCLKOB |
| 16 | FCLK | — | FCLK | FCLK |
| 17 | BE/RDY | — | BE/RDY | BE/RDY |
| 18 | CLK | — | CLK | CLK |
| 19 | CLKOB | — | CLKOB | CLKOB |
| 20 | PHI2 | — | PHI2 | PHI2 |
| 21 | BA/DODB | BCR3 | BA/1 | BA/DODB |
| 22 | VSS | — | VSS | VSS |
| 23 | VDD | — | VDD | VDD |
| 24 | P00/A0 | BCR0 | P00 | A0 |
| 25 | P01/A1 | BCR0 | P01 | A1 |
| 26 | P02/A2 | BCR0 | P02 | A2 |
| 27 | P03/A3 | BCR0 | P03 | A3 |
| 28 | P04/A4 | BCR0 | P04 | A4 |
| 29 | P05/A5 | BCR0 | P05 | A5 |
| 30 | P05/A6 | BCR0 | P06 | A6 |
| 31 | P07/A7 | BCR0 | P07 | A7 |
| 32 | P10/A8 | BCR0 | P10 | A8 |
| 33 | P11/A9 | BCR0 | P11 | A9 |
| 34 | P12/A10 | BCR0 | P12 | A10 |
| 35 | P13/A11 | BCR0 | P13 | A11 |
| 36 | P14/A12 | BCR0 | P14 | A12 |
| 37 | P15/A13 | BCR0 | P15 | A13 |
| 38 | P16/A14 | BCR0 | P16 | A14 |
| 39 | P17/A15 | BCR0 | P17 | A15 |
| 40 | P30/A16 | BCR0 | P30 | A16 |
| 41 | P31/A17 | BCR0 | P31 | A17 |
| 42 | P32/A18 | BCR0 | P32 | A18 |
| 43 | VSS | — | VSS | VSS |
| 44 | VDD | — | VDD | VDD |
| 45 | P33/A19 | BCR0 | P33 | A19 |
| 46 | P34/A20 | BCR0 | P34 | A20 |
| 47 | P35/A21 | BCR0 | P35 | A21 |
| 48 | P36/A22 | BCR0 | P36 | A22 |
| 49 | P37/A23 | BCR0 | P37 | A23 |
| 50 | P70/CS0B | PCS70 | P70 | CS0B |
| 51 | P71/CS1B | PCS71 | P71 | CS1B |
| 52 | P72/CS2B | PCS72 | P72 | CS2B |
| 53 | P73/CS3B | PCS73 | P73 | CS3B |
| 54 | P74/CS4B | PCS74 | P74 | CS4B |
| 55 | P75/CS5B | PCS75 | P75 | CS5B |
| 56 | P76/CS6B | PCS76 | P76 | CS6B |
| 57 | P76/CS7B | PCS77 | P77 | CS7B |
| 58 | P20/D0 | BCR0 | P20 | D0 |
| 59 | P21/D1 | BCR0 | P21 | D1 |
| 60 | P22/D2 | BCR0 | P22 | D2 |
| 61 | P23/D3 | BCR0 | P23 | D3 |
| 62 | P24/D4 | BCR0 | P24 | D4 |
| 63 | VDD | — | VDD | VDD |
| 64 | VSS | — | VSS | VSS |
| 65 | P25/D5 | BCR0 | P25 | D5 |
| 66 | P26/D6 | BCR0 | P26 | D6 |
| 67 | P27/D7 | BCR0 | P27 | D7 |
| 68 | TG0 | TCR31 | — | TG0 |
| 69 | TG1 | TCR33 | — | TG1 |
| 70 | P40/NMIB/ABORTB | BCR5 · BCR6 BCR5 · BCR6B | P40 | NMIB ABORTB |
| 71 | P41/IRQB | EIER3 | P41 | IROB |
| 72 | P42/PIIB | PIBER0 | P42 | PIIB |
| 73 | P43/PIWEB/PIWRB | PIBER0 · PIBER1B PIBER0 · PIBER1 | P43 | PIWEB PIWRB |
| 74 | P44/PICSB/PIRDB | PIBER0 · PIBER1B PIBER0 · PIBER1 | P44 | PICSB PIRDB |
| 75 | P45/PIRS0 | PIBER0 | P45 | PIRS0 |
| 76 | P46/PIRS1 | PIBER0 | P46 | PIRS1 |
| 77 | P47/PIRS2 | PIBER0 | P47 | PIRS2 |
| 78 | P50/PID0 | PIBER0 | P50 | PID0 |
| 79 | P51/PID1 | PIBER0 | P51 | PID1 |
| 80 | P52/PID2 | PIBER0 | P52 | PID2 |
| 81 | P53/PID3 | PIBER0 | P53 | PID3 |
| 82 | P54/PID4 | PIBER0 | P54 | PID4 |
| 83 | P55/PID5 | PIBER0 | P55 | PID5 |
| 84 | VDD | — | VDD | VDD |

Next, the lead or pin functions for microcomputer 200 will be described. The WEB (write enable) signal (lead 13) is defined as "active low", and is an output with a "high" or "1" level when microprocessor 201 is reading data from an external memory or external I/O that is not present on microcomputer chip 200A (FIG. 3). WEB also is at a high level when it is reading or writing to internal memory, i.e., to SRAM 205, SROM 204, or internal (on-chip) I/O circuits on chip 200. When the WEB input is low, microprocessor 201 is writing to external memory or external I/O. The WEB signal is bi-directional, so that when the BE/RDY lead is low, the WEB signal is an input for DMA (direct memory access) operations to SRAM 205, ROM 204, on-chip registers, or on-chip I/O (i.e., the I/O port buffers). When the BE/RDY lead is at a high level, microprocessor 201 controls the WEB lead as an output.

The RUN/SYNC lead 14 goes low when microprocessor 201 is stopped as a result of a WAI (wait) or STP (stop) instruction, and goes high when microprocessor 201 is running. The RUN/SYNC lead 14 is utilized, for example, to signal an external oscillator and clock system to start FCLK or CLK. When bit 3 of the bus control register is set, the "sync" function causes lead 14 to be pulled to a high level when PHI2 is at its low level. When bit 3 of the bus control register is at a low level (for the normal operating mode), the RUN/SYNC lead 14 is at a high level during the entire PHI2 clock cycle. When RUN/SYNC lead 14 is low, the PHI2 clock signal may be stopped. Execution of a WAI instruction pulls RUN/SYNC lead 14 low when PHI2 is high, and it stays low until an enabled interrupt is requested or until the RES (reset) lead 10 goes from a low to a high level, starting microprocessor 201. The STP (stop) instruction pulls RUN/SYNC lead 14 low when PHI2 is high and stops the internal PHI2 clock. The RUN/SYNC lead 14 remains low and the internal PHI2 clock remains stopped until an enabled interrupt is requested or RES lead 10 goes high.

The FCLK (fast clock) lead 16 can be started or stopped by writing "0" to Bit 0 in the SSCR register of FIG. 1H, and is restarted by writing that bit to a "1". (The slow clock CLK can never be stopped.)

The PHI2 output on lead 20 is the main system clock used by microprocessor 201 for instruction timing, on-chip and off-chip memory accesses, and I/O timing, and also is used by Timers 0–7.

The CLK and FCLK inputs on leads 18 and 16, respectively, are used by the timers for the PHI2 system clock generation, counting events, or implementing real time clock functions. The CLK0 and FCLK0 outputs on leads 19 and 15, respectively, are the inverted CLK and FCLK inputs which are used for oscillator circuits that employ crystals or other time bases.

The BE/RDY (bus enable/ready) input lead 17 controls the address bus, data bus, and WEB (write enable) signals. When RES (reset) LEAD 12 goes high to signal the power-up condition, microprocessor 201 starts. If BE/RDY lead 17 goes low when PHI2 is low, the addresses A0–A23 and WEB lead 13 are input, allowing DMA (direct memory and I/O access) for de-bug purposes. Data from data lines D0–D7 is written to any register being addressed by A0–A23 when WEB is low. Data is read from D0–D7 when WEB is high. Microprocessor 201 is stopped when BE/RDY is low. When BE/RDY is high, A0–A23, D0–D7, and WEB are outputs controlled by microprocessor 201. When BE/RDY is pulled low during PHI2 high time, BE/RDY does not affect the direction of the address bus, data bus, and WEB signals. When BE/RDY is pulled low when PHI2 is high, microprocessor 201 is stopped so that it may be "single stepped" (i.e., operated one machine cycle at a time) in de-bug mode.

The reset (RES) input/output lead 12, which is defined as active low, stops the entire microcomputer 200 and puts it into a static low power state if RES is low for more than two PHI2 cycles. After such a reset, all I/O leads become inputs, and all input and output buffers are disabled. However, the BE/RDY and WEB inputs are unaffected by the RES input. When RES lead 12 goes from a low to a high level, RUN/SYNC lead 14 goes high, and the bus control register in block 235 is initialized to $89 if BE/RDY is low or to $00 if BE/RDY is high. Microprocessor 201 then begins the power-up reset sequence in which its program counter is loaded with a reset vector that points to the first instruction to be executed. RES lead 12 is a bi-directional lead that is pulled low internally for "restarting" due to a "monitor timeout" in which Timer 0 "times out" (i.e, is decremented to zero), thereby causing a system reset.

The Pxx I/O port leads P00–P07, P10–P17, P20–P27, P30–P37, P40–P47, P50–P57, and P60–P67 all are bi-directional. Each bi-directional port has a port data register PDx and a port data direction register PDDx. A "0" in the port data direction register defines the associated I/O port lead as an input with the output driver transistors in an "off" state. A "1" in a port data direction register defines the corresponding I/O port lead as an output. Reading of any port data register involves reading the states of the corresponding I/O port leads. After a reset operation, all I/O port leads become input leads with both the data and data direction registers reset to "0"s.

Port 7 has the above-mentioned chip select register (CSR), that is used to enable chip select leads CSx. The eight chip select signals CS0–CS7 are decoded from the states of various ones of address bus conductors A4–A23. The CS0–CS7 outputs can be used as additional address outputs to select sixteen megabyte blocks of memory. A "1" in bit x of the chip select register of Port 7 enables chip select values to be output on the corresponding lead of Port 7.

The system memory map allows various ones of the chip select signals CS0–CS7 to be utilized to conveniently select various size blocks of external memory, registers, and input/output circuitry. (Although referred to using the conventional term "chip select" outputs, some of the CS0–CS7 output signals can be used as "card select" or "header select" outputs, as subsequently indicated with reference to FIGS. 2A and 2B.) The chip select outputs CS0–CS7 are individually enabled as outputs on Port 7 by the above-mentioned chip select register CSR. CS7 is automatically enabled by CSR bit 7 being equal to "1". Each of the eight chip select outputs CS0–CS7 is dedicated to one block of memory. The chip select outputs CS0–CS7 are defined as "active low", i.e., are asserted when at a low level. When the same leads are programmed by enable register 210 as chip select outputs, they come up at a high level as a result of a chip reset operation.

Port 0, Port 1 and Port 3 function as address bus ports when the bus control register bits 0 and 7 are set to "1's" and bit 3 is set to "0", for normal operating mode external memory addressing. Address leads A0–A23 are all "1's" when addressing "on-chip" memory. When bit 3 of the bus control register is set to a "1", the address bus is active so that internal read and write operations can be traced in a de-bug mode.

Port 2 can be configured as a data bus port (D0–D7) by the bus control register. When bits 0 and 7 of the bus control register are set to a "1", and bit 3 thereof is set to a "0", D0–D7 are all "1's" when microprocessor 201 is addressing on-chip memory. When bit 3 of the bus control register is a "1", the data bus D0–D7 is "active" so that internal read and write operations can be traced.

Edge interrupt leads PE60 and PE56 have positive edge-sensitive interrupt inputs multiplexed with the I/O functions. When one of these leads is "enabled" as an edge interrupt, as defined by the bus control register, an interrupt is generated and the associated bit is set by an internal one-shot circuit in the interrupt flag register 227B or 227E of FIG. 1C on a positive transition from a "0" to a "1". The transition from a "1" to a "0" has no effect on the interrupt flag register. When the associated interrupt enable register bit is set to a "1", microprocessor 201 will be interrupted, provided the interrupt flag bit in the microprocessor's internal status register is cleared to a "0". When the interrupt flag bit is a "1", interrupts are disabled.

Similarly, edge interrupt leads NE66, NE64, and NE57 have negative edge-sensitive interrupt inputs multiplexed with the I/O functions of these leads. When the lead is defined as an edge interrupt by the bus control register, an interrupt is generated and the associated bit is set by an internal one-shot circuit on a negative transition from a "1" to a "0". The opposite transition has no effect on the interrupt flag register 227B or 227E. When the associated bit of interrupt enable register 227D or 227G of FIG. 1C is set to a "1", microprocessor 201 will be interrupted provided the interrupt flag bit in the internal microprocessor status register is cleared to a "0", and when the interrupt flag is a "1", interrupts are disabled.

The port signal P41 I/O function is available with the IRQ level-sensitive interrupt input on package lead 71. When IRQ is low the associated interrupt flag is set to a "1" in interrupt flag register 227E. When the associated bit of interrupt enable register 227G is set to a "1", microprocessor 201 will be interrupted, provided its interrupt flag is cleared to a "0" so as to allow interrupts. I/O port lead P40 has its I/O data multiplexed with the NMI (non-maskable interrupt) edge-triggered interrupt and the abort signal ABORT and is controlled by bus control register bit 5. When NMI is selected by bit 6 of the bus control register, microprocessor 201 will be interrupted on all negative edges of NMI.

Each of UARTs 229-0 through 229-3 has a receiver 251 that is enabled when Bit 5 of Asynchronous Control and Status Register 229C is set to a "1", and package leads 4, 6, 8 and 10 become the asynchronous receiver input RXD signals. When transmitter 250 of UART 229 is enabled by Bit 0 of the Asynchronous Control and Status Register 229C, then package leads 5, 7, 9 and 11 become the asynchronous transmitter output TXD signals.

When UARTs 229 are not in use, Timer 4 can be used for counting input negative pulses of TIN or P60. Timer 4 also can be used to generate a square wave or rectangular waveform on TOUT lead 5 (P60). When counting negative pulses on TIN, the TIN frequency should always be less than one-half the frequency of PHI2. TOUT changes state on every timeout of Timer 4. Therefore, the varying waveform frequency depends on the Timer 4 latch values, and may be modified under software control.

The four UARTs provided in microcomputer 200 allow serial port communication capability similar to that of the serial interface bus in my U.S. Pat. No. 5,123,107. Therefore the serial interface bus is omitted, and instead the parallel interface bus (PIB) system shown in FIGS. 1A, 1B, and 1F is included to allow as many as 48 bits of data to be transferred between handshakes. Registers PIR2–PIR7 can be pre-loaded via data bus 202.

In accordance with the present invention, chip control logic circuitry 235 contains two oscillators, as shown in FIG. 1H. A fast oscillator 351, which may be triggered by a crystal oscillator 35 or other suitable time base, may oscillate at a high frequency rate, for example 4 megahertz. Fast clock oscillator circuit 351 can be stopped by a software controlled input 353, which is connected to bit 0 of the SSCR register. Fast clock oscillator 351 produces a fast output clock signal FCLK on conductor 354A, which is input to a gate circuit that divides FCLK by 4 if a signal SLOW is present and provides the result on conductor 354. That signal is applied to a logic circuit including two-input AND gates 355 and 358 having their outputs applied to a NOR gate 356, the output of which is produced on conductor 357 and inverted again to produce the internal signal PHI2.

Conductor 354 also is applied to an input of the synchronizing circuit 362, which generates an enable signal on conductor 364 that is applied to one input of AND gate 358, and also is inverted by inverter 363 and applied to one input of AND gate 355.

A second oscillator, slow oscillator circuit 359, is triggered by a slow crystal circuit 360 at, for example, 32 kilohertz. Slow clock oscillator circuit 359 generates a 32 kilohertz squarewave CLK on conductor 361, which is supplied as another input to synchronizing circuit 362. The enable or oscillator select signal 370 comes from the SSCR register Bit 1. Conductor 361 is connected to one input of two input NAND gate 358.

Following is a description of the modifications to the prior art portion of the clock circuitry shown in FIG. 1H to effectuate the automatic speed and power control features of the present invention: The output 354A of FCLK oscillator 351 is connected to the input of a divide-by-four circuit 365. The output of divide-by-four circuit 365 is connected to an input of AND gate 366A. An enable input of divide-by-four circuit 365 receives the signal SLOW on conductor 368 and is connected by conductor 368 to the other input of AND gate 366A and to an input of an inverter 369. The signal "SLOW" selects the FCLK÷4 rate for PHI2. The output of inverter 369 is connected to an input of AND gate 366B, the other input of which is connected to the output of FCLK oscillator 351. The outputs of AND gates 366A and 366B are connected to inputs of NOR gate 366C, the output of which is coupled by inverter 367 to conductor 354.

The STOP FCLK (bit 0 of the SSCR register) is connected to one input of NOR gate 373, the other input being connected to conductor 364A. The output of NOR gate 373 is inverted by inverter 374 and connected to conductor 353.

The signal SLOW is produced in response to bits 3–7 of the SSCR (speed control register) 130A and the CS3–CS7 register bits. When SLOW is at a "0" level, as a result of one of SSCR bits 3–7 being a "1" and corresponding to one of CS3–CS7 which also is at a "1", then the speed of the signal on conductor 354 is the speed of FCLK oscillator 351. When SLOW is at a "0" level, the speed of the signal on conductor 354 is the FCLK÷4 rate.

The connection of conductor 364A to one input of NOR gate 373 operates to prevent PHI2 from switching from the FCLK or FCLK÷4 rate to the CLK rate until synchronization is complete.

The synchronizing circuit requires that the fast oscillator circuit 351 run substantially faster (at least three or four times faster) than the slow clock oscillator circuit 359. The stop SCLK signal on conductor 353 is produced in response to bit 0 of the SSCR register.

This dual oscillator arrangement allows the microcomputer 200 to be utilized for very low power consumption applications, wherein the internal clock can be selected to operate at the slow 32 kilohertz rate supplied by slow oscillator circuit 359, greatly reducing AC power dissipation. Whenever high speed operation is needed, the fast clock oscillator 351 can be selected by providing an enable signal on conductor 353 and allowing enough time for the fast oscillator signal to stabilize (typically a few milliseconds) during which the slow clock oscillator signal continues to be produced on conductor 357 and used by the entire microcomputer 200. Then, under software control (bit 1 of the SSCR register), control of the main system clock signal PHI2 on conductor 357 is switched over from the slow CLK frequency of oscillator 359 to the FCLK signal produced on conductor 354 by the fast clock oscillator circuitry 351.

A "monitor" program can be stored in an on-board ROM or an external ROM, the monitor including a collection of routines to perform power management functions which use the above clock speed switching features to control power dissipation. The power management portion of the monitor controls the PHI2 speeds at which various portions of on-chip memory, external memory, and peripheral devices are operated, using the FCLK÷4 speed for accessing external memory and peripheral devices, and where appropriate, for accessing on-board memory.

Another portion of the monitor program polls certain addresses of off-chip EPROMs and off-chip RAMs and also one or more PCMCIA cards and determines priority of execution of programs stored therein.

To this end, the system speed control register SSCR allows the internal clock signal PHI2, which clocks the entire microcomputer chip 200, to be selected under program control to be CLK (which might be very slow, eg. 32 kHz), FCLK (which might be 4 MHz), or FCLK÷4 (eg., 1 MHz). This allows microcomputer 200 to operate at very low power under standby conditions by setting bit 1 of the SSCR register to "0" to select CLK. Maximum speed operation can be achieved by setting Bit 1 of the SSCR register to "1" and Bit 3 thereof to "1" to select FCLK. Reduced high speed performance to allow convenient access to slow external memory or to reduce chip power by a factor of four can be achieved by setting Bit 1 to "1" and Bit 3 to "0" in the SSCR register to select FCLK÷4 to be PHI2.

Above described FIG. 1H shows the schematic diagram of the circuitry needed to accomplish such operation. Bits 4–7 of the SSCR register determine which one of the corresponding chip select outputs CS4–CS7 operates at the FCLK rate or the FCLk÷4 rate, provided that Bit 3 of the SSCR register is at a "1". If Bit 3 of the SSCR register is at a "0", the entire chip operates at the FCLK÷4 rate regardless of what Bits 4–7 of the SSCR register are set to. The timing diagram of FIG. 1J shows how the main microcomputer clock PHI2 is equal to FCLK divided by 4 whenever the "slow memory select" (i.e., a "slow chip select", or a "slow card select") condition is established by the above described coincidence of a chip select output signal and a "0" in a corresponding bit of the SSCR register (provided SSCR Bit 3 is a "1" ). The timing diagram of FIG. 1J also shows how PHI2 remains at the FCLK frequency whenever the "fast memory select" (i.e., a "fast chip select" or "fast card select") condition is established by the above described coincidences of a chip select output signal and a "1" in a corresponding bit of the SSCR register (assuming, of course, that SSCR Bit 3 is at a "1"). Typically, CS4–CS7 are used to select various blocks of external memory.

In accordance with another aspect of the present invention, a plurality of external "bus holding circuits" such as the one shown in FIG. 1I are connected to various external bus conductors. Each bus holding circuit contains a first low power CMOS inverter 332 having an input connected to an external bus conductor 331 and an output connected to the input of another low power CMOS inverter 333 having its output connected to the external bus conductor 331. The output impedance of inverter 333 is so high (i.e., a few hundred kilohms to several megohms) that the external or internal circuitry connected to the external bus conductor 331 can easily "overpower" inverter 333 and force a changed state. The bus holding circuits, however, ensure that if microcomputer 200 is connected in a configuration in which a particular external bus line is unconnected to anything, a bus holding circuit will hold it in a particular state, preventing anomalous test results due to indeterminate levels on unused external bus conductors when the output driver circuits connected thereto are in high impedance states. (See my U.S. Pat. No. 5,212,800, issued May 18, 1993.) The bus holding circuits can be used to advantage during operation of the power control portion of the subsequently described monitor to "quiet" the external I/O buses not presently being used, the internal buses being "quieted" by a WAIT state.

To make use of the power management flexibility afforded by the program selectable speeds of PHI2 and the ability to conveniently address small on-chip or external pages or blocks of memory, a power management routine of a "monitor" program usually will be transferred into SRAM 205. The power management routine performs the functions of determining which external and internal buses of microcomputer 200 should be "inactivated" or "quiet" and establishing the appropriate "inactive" bus conductor voltage levels, which then are maintained using the bus holding devices of FIG. 1I. The power management routine also determines which buses are required for the present application (such as responding to an input from a keyboard, a timer, or an external peripheral device). The power management routine also determines, on the basis of information in the program currently being executed, which of the available speeds to select for PHI2 while pages of various internal and external memories are accessed. The power management routine also determines when to inactivate all buses and the states they are to assume when microcomputer 200 goes into a low power standby mode.

The memory map decode circuitry includes decode circuitry in block 212 of FIGS. 1A and 1B to decode addresses A0–A23 in order to select various conveniently sized blocks of external or internal memory. Various combinations of the address bits A0–A23 and chip select outputs CS0–CS7 can be decoded to select various blocks of internal or external memory, allowing the remaining address bits to address words within the selected blocks.

Figure 2A:
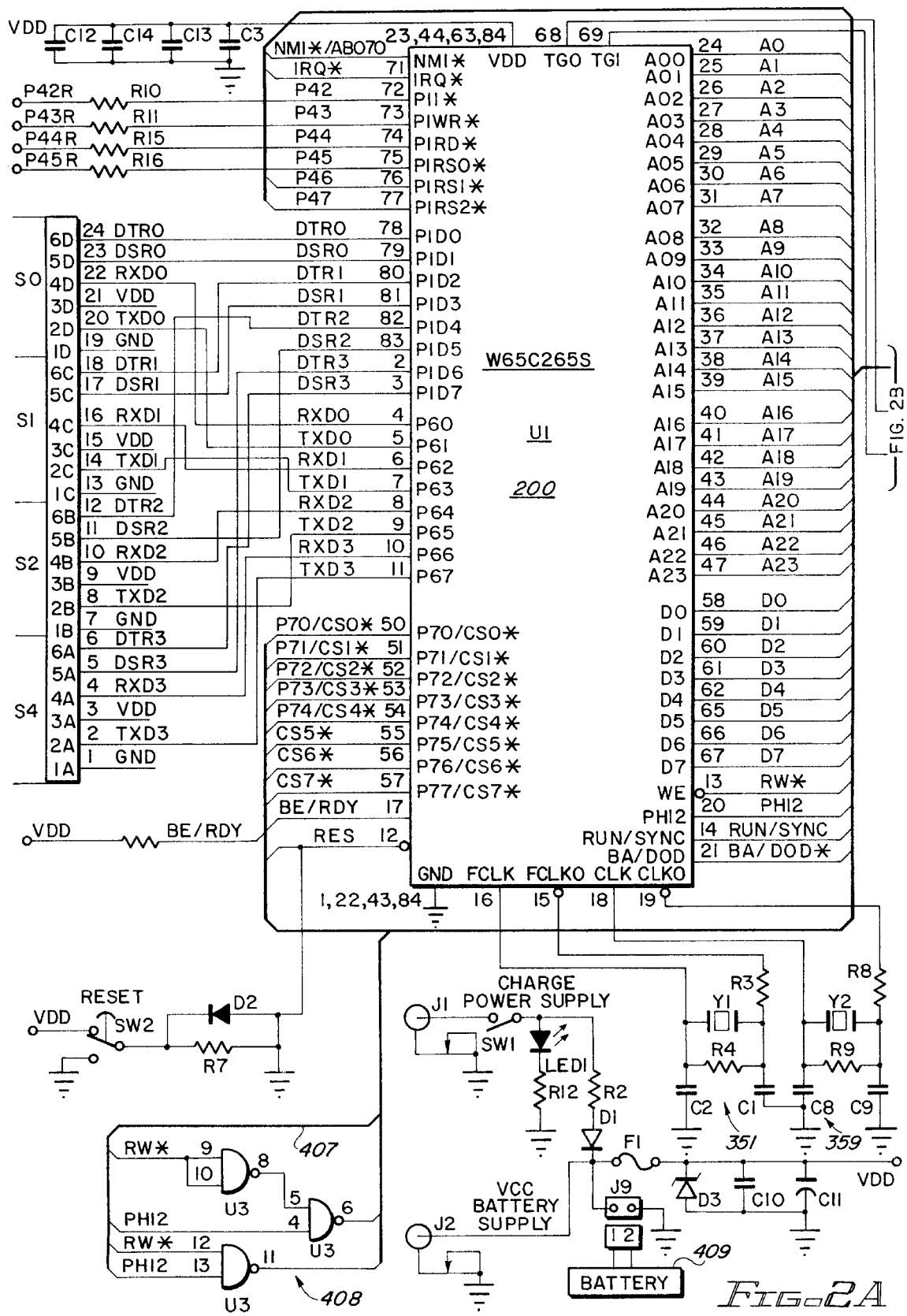
FIGS. 2A and 2B constitute a block diagram of a low cost, high performance computer implemented using the microcomputer chip of FIGS. 1A and 1B.
Figure 2B:
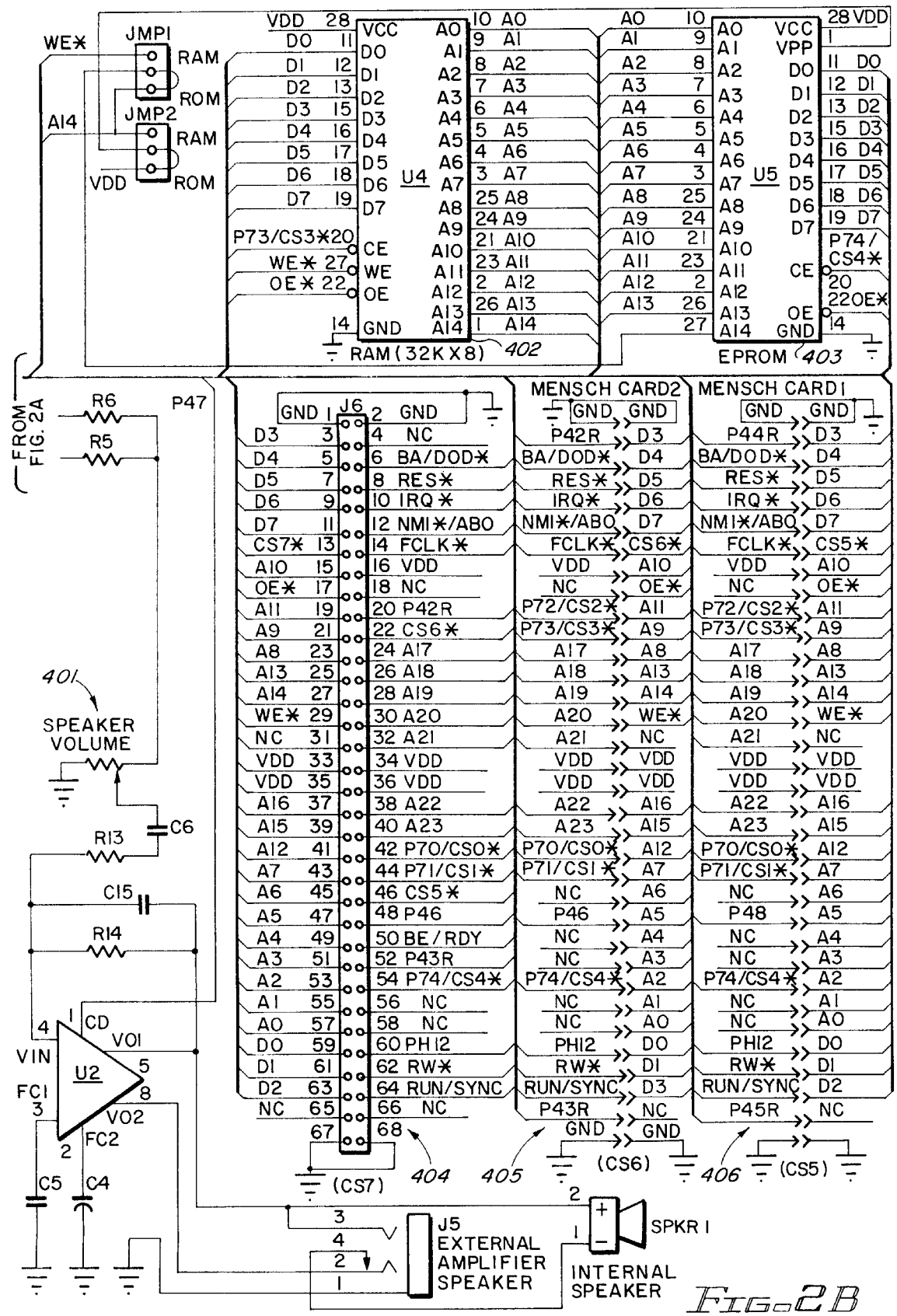

FIGS. 2A and 2B illustrates a portable computer 400 based on the W65C265S microcomputer chip 200 in which the power dissipation can be advantageously managed by the speed/power control function of the monitor mentioned above. Computer 400 includes a rechargeable battery 409 that is continuously charged by an external trickle charger connected to jack 410. However, if computer 400 is operated from battery 409 for extended times, minimizing the power dissipation is very important. To this end, the speed/power control monitor mentioned above operates to select the slowest acceptable (CLK, FCLK÷4, or FCLK) speed of PHI2 to operate a display (not shown), a keyboard (also not shown) connected to ports 50–53, an external speaker system 401, slow external RAM 402, and/or slow external EPROM 403, and also "deactivates" buses not presently being used. This can greatly increase the amount of time computer 400 can operate before rechargeable battery 409 becomes discharged (at which point the LCD screen display becomes inoperative). Computer 400 includes a pair of standard PCMCIA (Personal Computer Memory Card International Association) card slots 405 and 406, which are selectable by CS5 ("card select 5") and CS6 ("card select 6"), respectively. The user can simply plug in any PCMCIA compatible memory card containing software which then can be executed without use of an operating system (such as DOS), resulting in a low cost, high speed (depending on the frequencies of oscillators 351 and 359), low power computer. Computer 400 also includes a male internal expansion "header" 404 which is selectable by CS7. This allows connection of external modules to expand the capability of computer 400 in a flexible manner. For example, an Intel 86486 chip could be included on a PC board plugged into header 404 to increase the computing capability of computer 400.

The above-mentioned monitor program, which is stored in on-chip ROM 204 of microcomputer chip 200 of FIGS. 1A and 1B, is described with reference to the flow charts of FIGS. 3 and 4. Note that the source code printout of the monitor program is included herewith as the microfiche appendix referred to on the first page hereof.

There are several ways for the software being executed by microcomputer 200 of FIGS. 1A and 1B or the computer 400 of FIG. 2 which includes microcomputer 200 to arrive at the point it enters the power saving routine portion of the monitor program. A flow chart of such power saving routine is shown in FIG. 3. For example, a timer is used to measure the amount of time elapsed since the last keystroke or to measure time elapsed since the time-of-day clock alarm was set. If such timer "times out", then the power saving routine is entered via label 300, to thereby reduce drain on a battery powering the computer when no one is using it.

Alternatively, the programmer could write the program being executed to cause the power saving routine to be entered on the basis of some other criteria. The power saving routine reduces the operating speed and power consumption to a "standby" level. Note that this portion of the monitor program does not deal with a decision to switch the frequency of PHI2 to the low speed 32 kilohertz rate (which is adequate for certain operations wherein lower power consumption is needed and relatively few interrupts are likely to occur).

As mentioned earlier, microcomputer 200 can apply the FCLK÷4 clock frequency to main clock signal PHI2 or, alternatively, to various individual chip select (CS) outputs in order to allow access to slow memory devices while PHI2 continues to run at the higher FCLK frequency. This option of operation occurs during a power up sequence, which is shown in blocks 411A and 411B of FIG. 4 hereof. Note that it is easier to deal with the interrupt handling routines if the frequency of PHI2 remains at the FCLK frequency while specific chip select outputs of microcomputer chip 200 are operated at the lower frequency FCLK÷4 than is the case if PHI2 also operates at the lower FCLK÷4 frequency (since the microcomputer chip 200 has four high speed input ports that may be involved in handling of interrupts).

Referring to FIG. 3, after the power saving routine is entered by label 300, it performs several standing "housekeeping functions", including resetting a stack pointer and clearing interrupt flags, as indicated in block 301. As indicated in block 302, the above-described time of day clock is allowed to continue to operate in response to the continuous slow 32 kilohertz CLK signal.

Referring to block 304, note that computer 400 of FIGS. 2A and 2B supplies a 5 volt supply voltage to an I/O device connected to at least one of the I/O ports of microcomputer 200. This is to provide power to RS232 interface logic coupling computer 400 to a host computer (not shown) and convert the ground and +5 volt power supply levels applied to computer 400 to the ±10 volt levels needed for RS232 communication. Such RS232 interface logic typically draws 10 to 20 milliamperes of current. To achieve power reduction during low power "standby" operation, it is desirable to turn off such power supplied to the I/O port (or ports) used for RS232 communication.

Next, the monitor program enters block 305 of FIG. 3 and sets all of the buses, including the address, data, and I/O buses of FIGS. 1A and 1B to their low current states. In block 306, the power saving routine also sets all external chip select (CS) outputs to a "high" level, which are their low current states. This also deselects any external I/O devices connected to the system buses.

Next, the power saving routine of FIG. 3 switches the PHI2 clock frequency to the low (32 kilohertz) CLK frequency, selects internal RAM 205 (FIGS. 1A and 1B), and deselects external RAM 402 (FIGS. 2A and 2B), as shown in block 307. The power saving routine then waits for several clock cycles to allow the circuitry 350 of FIG. 1H to complete the transition of PHI2 from the 4 Mhz FCLK frequency to the 32 Khz CLK frequency. Then, in block 308, the power saving routine turns off the FCLK oscillator 351 (FIG. 1H), which accomplishes a further power savings.

At this point, computer 400 is in its standby low power operating mode, operating at the 32 kilohertz CLK frequency and capable of responding to interrupts with the time of day clock continuing to operate. In block 309, the power saving routine causes a short delay to occur to allow various bus conductor transitions to settle before entering a "restart" subroutine identified by label 310.

The purpose of the restart subroutine is to determine when to switch computer 400 from the standby low speed, low power mode back to its normal high speed operating PHI2 clock frequency of FCLK or FCLK÷4.

The above-mentioned time-of-day clock has an associated alarm which can be set, causing an alarm output to be produced when the alarm set time arrives. In decision block 311, the restart subroutine determines if the time-of-day alarm has been set, and if it has, the restart subroutine goes to decision block 312 and determines if the alarm output is active. If it is, the restart subroutine goes to block 313 and jumps to either (1) the "standard" or default restart routine (which in the described embodiment is the power up start routine of FIG. 4) that switches the PHI2 clock frequency back to the FCLK frequency, or (2) to a user defined restart routine.

If the determination of either decision of decision blocks 311 or 312 is negative, the restart subroutine goes to decision block 315 and determines if any key has been pressed. If it has, the subroutine goes to above described block 313. The address of the restart routine or the user defined restart routine is stored in a location of on-chip RAM 205 of microcomputer 200. When the restart subroutine enters block 313, it jumps to the routine located at that address.

If the power saving routine was entered at label 300 as the result of a time-out of a timer set by the last keystroke or the time-out of an alarm set timer, the restart subroutine goes to block 313 and jumps to a default subroutine, which preferably is the power up start routine of FIG. 4, subsequently described. Or, the user can supply the address of a suitable different restart subroutine. If block 315 determines that no key has been pressed, the restart subroutine then goes to decision block 316 and determines if such a user supplied low power routine exists. If the determination of decision block 316 is affirmative, the program executes the user-supplied low power routine as indicated in block 319. That results in a decision, indicated in block 320, which causes the restart routine either to go to block 313 or re-enter the restart routine at label 310. If the determination of decision block 316 is negative, the routine simply re-enters the restart subroutine loop at block 310.

If the determination of decision block 315 is negative, i.e., that no key has been pressed, and if an external control signal presents a "1" level to computer 400, the user may want to restart normal operation of computer 400. In this case, decision block 316 checks to determine if there is such a user-supplied low power routine. The result of such test can be either a return to full power operation or re-entry into the restart subroutine loop at label 310.

As explained above, when computer 400 has been switched to a low frequency, low power standby condition as explained with regard to the flow chart of FIG. 3, the external buses have been set to their low power states. The bus holding devices of FIG. 1G maintain the bus conductors in the set states.

After the power up start routine of FIG. 4 has been entered by a label 400, the first step is to enable the external buses, as indicated in block 401. In block 402, the power up start routine attends to several "housekeeping" tasks, including setting the stack pointer to a desired address, setting the W6C265 chip to operate in a "non-emulation" or "16-bit" mode, and setting certain 8-bit index modes. The power up start routine then goes to block 403 and enables the chip select output CS5, banks 00-3F, to which a PCMCIA card may be coupled. The power up start routine then goes to decision block 404 and determines if the hex 00:8000 address of a PCMCIA card contains the indicator "WDC".

The indicator "WDC" means that the PCMCIA card has been programmed to immediately take control of all program execution of the computer 400. If this is the case, the power up start routine goes to address hex 00:8004 of block 405, which contains the address of the program to be executed by the PCMCIA card and exits to that address to begin execution of the program. This exit is labeled "Exit 1".

If the determination of decision block 404 is negative, the power up start routine goes to decision block 406, determines if the address hex 00:8000 has been checked with CS4 enabled, and if this is not the case, goes to block 407, enables the chip select output CS4, and returns to decision block 404. If the determination of decision block 404 is affirmative this time, the routine goes to address hex 00:8004 of EPROM 403 of computer 400, and exits to the program to be executed off-chip. This exit is referred to as "Exit 2". If the determination on the second pass through decision block 404 is negative, the power up start routine goes back to decision block 406, produces an affirmative determination, goes to block 408, and enables chip select output CS3 and hence enables on-chip RAM 402.

As indicated in block 409, the program then goes to address hex 00:0800 of RAM 402 and determines if the indicator "WDC" is present therein. If it is, the program goes to block 410, jumps to the first address specified in location hex 00:0804 of RAM 402 and executes the program located there. This exit is labeled "Exit 3" and results in execution of that program.

If the determination of decision block 409 is negative, it assumes that most likely microcomputer 200 is included in computer 400 or that it is a stand-alone microcomputer, and the power up start routine then enables all the chip select outputs CS0, CS1, and CS4 ... 7 which are used in computer 400.

The power up start routine then goes to decision block 411A and determines whether there is a slower peripheral device (such as a slow RAM) present on any external port or bus. If that determination is affirmative, the power up start routine then goes to block 411B and sets the frequency of the associated chip select output to the frequency of FCLK÷4. In any case, the power up start routine goes to block 412 and starts the fast clock oscillator 351 (FIG. 1H) and hence the fast clock FCLK. After allowing enough time for this transition to be accomplished by the circuitry of FIG. 1H, the power up start routine initializes the various interrupt flags and timers, as indicated by block 413.

The power up start routine then enters block 414 and compares the frequency of FCLK to previously stored "acceptable" values thereof, and if the frequency of FCLK is close to a particular stored value, accepts that stored value as the actual present frequency of FCLK. The power up start routine program then goes to block 415 and determines "a clock speed index number" by which to multiply the contents of various timers, such as those associated with establishing a baud rate, so that the correct elapsed time values associated with such timers can be accurately determined. (Note that this is a conventional technique.)

Next, the power up start routine goes to block 416, performs a parity check on the contents of the time-of-day clock, determines if the present reading of the time-of-day clock is valid. If it is determined in decision block 417 that the present reading is not valid, a default value which is valid (although not necessarily accurate) is set, as indicted in block 418.

As indicated in decision block 419, the power up start routine then goes to address DEF8 in EPROM 403 to determine if the indicator "WDC" is stored therein. If it is, the power up start routine effectuates a jump ("Exit 4") to EPROM 403, as indicated in block 420. Execution of the program therein then is performed. If the determination of decision block 419 is negative, the power up start routine sets up default values for the various I/O ports and then goes to another portion of the monitor program in ROM 204 of microcomputer chip 200. The exit labelled "Exit 5" from the ROM program indicates that program execution continues under control of a program within microcomputer 200 (rather than in a PCMCIA card plugged into port CS5 or in EPROM 403).

Thus, the invention provides a flexible, non-dedicated computer wherein computer 400 and microcomputer chip 200 therein allow the user the option of relying on the monitor program permanently stored in on-chip SROM 204 to perform all of the ordinary initialization or "housekeeping" tasks necessary for system operation, while also being able to prioritize execution of a number of stored application programs and to control which memory devices are used as working RAM as the various application programs are executed. The user can allow automatic initialization by the monitor program, and establish user-selected priorities for execution of multiple application programs, and easily alter any initialization parameters as desired, all in a simple, inexpensive computer.

While the invention has been described with reference to a particular embodiment thereof, those skilled in the art will be able to make the various modifications to the described embodiments of the invention without departing from the true spirit and scope of the invention.

By way of definition, what is meant by the statement that PHI2 clocks the "entire" microcomputer chip is that the entire memory bus and microprocessor core sections are clocked at the selected frequency of PHI2, even though timers 0–7 operate according to the selectable clock rates.

What is claimed is:

1. A method of operating a computer including a microcomputer chip to reduce power dissipation and prioritize execution of a plurality of stored programs, including a first program and a second program, the method including the steps of:

(a) supplying power to a first I/O port of the microcomputer chip, and producing a main clock signal having a fast first frequency in response to a fast first clock signal and operating a time-of-day clock in response to a continuous second clock signal having a slow second frequency;

(b) determining that low power standby operation of the computer is needed;

(c) entering a power saving routine of a monitor program stored in a ROM of the microcomputer chip in response to the determining of step (b), and continuing to operate the time-of-day clock in response to the continuous second clock signal;

(d) executing the power saving routine by
   i. applying deselect signals to each of a plurality of chip select outputs of the microcomputer chip, and setting at least one external bus of the computer to its low power state,
   ii. switching the frequency of the main clock signal to the slow second frequency,
   iii. turning off a fast oscillator circuit producing the fast first clock signal,
   iv. determining that a power-up operation is needed by servicing an interrupt at the slow second frequency, and
   v. enabling the external buses;

(e) checking a first address in a first memory device in or coupled to the computer to determine if an indicator is present at the first address, and if the indicator is present, executing a first program stored in the first memory device at a location pointed to by a pointer stored at the first address; and (f) if the indicator is not present at the first address, checking a second address in a second memory device in or coupled to the computer to determine if the indicator is present at the second address, and if the indicator is present at the second address then executing a second program at a location pointed to by a pointer stored in the second address.

2. The method of claim 1 wherein executing the power saving routine includes turning on the fast oscillator circuit and switching the frequency of the main clock signal back to the fast first frequency if the indicator is not present at the first address or the second address.

3. The method of claim 2 including determining if a slow memory device is coupled to or in the microcomputer and, if so, then dividing the fast first clock signal down to produce a lower frequency third clock signal having a third frequency and clocking circuitry of at least a portion of the microcomputer chip at the third frequency in response to the third clock signal.

4. The method of claim 3 wherein executing the power saving routine includes switching the frequency of the main clock signal back to the fast first frequency after performing the steps of claim 3.

5. The method of claim 3 wherein executing the power saving routine includes enabling the slow memory device at the third frequency and also switching the frequency of the main clock signal to the fast first frequency.

6. The method of claim 2 including checking a third address in one of the first and second memory devices to determine if the indicator is present at the third address, and if so then executing in place a third program stored in the one of the first and second memory devices at an address pointed to by a pointer stored at the third address, and if the indicator is not present at the third address, then returning control of program execution to a location in the monitor program.

7. The method of claim 2 wherein the deselect signals of step (d)(i) disable all external memory devices coupled to the microcomputer chip.

8. The method of claim 1 wherein executing the power saving routine includes the step of turning on the fast oscillator circuit and switching the frequency of the main clock signal back to the fast first frequency in response to execution of one of the first and second programs if the indicator is present in the first address or the second address, respectively.

9. The method of claim 1 wherein executing the power saving routine includes turning off power to the first I/O port.

10. The method of claim 1 wherein step (b) includes setting a timer in response to a keystroke and determining that the low power standby operation is needed if the timer times out.

11. The method of claim 1 wherein step (d)(iv) includes sensing an interrupt signal produced by time-out of a timer indicating no key has been depressed recently.

12. The method of claim 1 including, after step (d)(iii), determining whether there is a user-supplied power saving routine, and if there is executing it and jumping to a user-supplied power up routine.

13. The method of claim 1 wherein step (h) includes sensing an interrupt signal produced by time-out of a timer indicating no key has been depressed recently.

14. A method of operating a computer including a microcomputer chip to prioritize execution of a plurality of separate stored programs, including a first program and a second program that is not a subroutine of the first program, the method including the steps of:

(a) entering a power-up routine in a monitor program stored in a ROM in the microcomputer chip upon determining that a power-up operation is needed;

(b) operating the monitor program to check the contents of a first location having a first address in a first memory device in or coupled to the computer to determine if an indicator is present at the first address, and if the indicator is present, executing a first program stored in the first memory device at a location pointed to by a pointer stored at the first address; and (c) operating the monitor program to check the contents of a second location having a second address in a second memory device in or coupled to the computer if the indicator is not present at the first address to determine if the indicator is present at the second address, and if the indicator is present at the second address then executing a second program at a location pointed to by a pointer stored in the second address.

15. The method of claim 14 including checking a third address of one of the first and second memory devices to determine if the indicator is present at the third address, and if so then executing in place a third program stored in the one of the first and second memory devices pointed to by a pointer stored at the third address, and if the indicator is not present at the third address, then returning control of program execution to a location in the monitor program.

16. A method of operating a computer including a microcomputer chip to prioritize execution of a plurality of stored programs, including a first program and a second program, the method including the steps of:

(a) entering a power-up routine in a monitor program stored in a ROM in the microcomputer chip upon determining that a power-up operation is needed;

(b) operating the monitor program to check a first address in a first memory device in or coupled to the computer to determine if an indicator is present at the first address, and if the indicator is present, executing a first program stored in the first memory device at a location pointed to by a pointer stored at the first address; and (c) operating the monitor program to check a second address in a second memory device in or coupled to the computer if the indicator is not present at the first address to determine if the indicator is present at the second address, and if the indicator is present at the second address then executing a second program at a location pointed to by a pointer stored in the second address, the method including turning on a fast oscillator circuit and switching the frequency of a main clock signal to a fast first frequency of the fast oscillator if the indicator is not present at the first address or the second address.

17. The method of claim 14 including the step of turning on a fast oscillator circuit and switching the frequency of the main clock signal to a fast first frequency of the fast clock oscillator in response to execution of one of the first and second programs if the indicator is present in the first address or the second address, respectively.

18. The method of claim 14 including determining if a slow memory device is coupled to or in the microcomputer and, if so, then dividing a fast first clock signal down to produce a lower frequency second clock signal and clocking circuitry of at least a portion of the microcomputer chip at the lower frequency in response to the second clock signal.

19. The method of claim 18 including enabling the slow memory device at the lower frequency and also switching the frequency of a main clock signal to the frequency of the fast first clock signal.

20. The method of claim 14 including enabling a plurality of external buses of the microcomputer chip.

21. A method of operating a computer including a microcomputer chip to reduce power dissipation, the method including the steps of:

(a) producing a main clock signal having a fast first frequency in response to a fast first clock signal, operating a time-of-day clock in response to a continuous second clock signal having a slow second frequency, and supplying power to a first I/O port;

(b) determining that low power standby operation of the computer is needed;

(c) entering a power saving routine of a monitor program stored in a ROM of the microcomputer chip in response to the determining of step (b), (d) continuing to operate the time-of-day clock in response to the continuous second clock signal;

(e) applying deselect signals to each of a plurality of chip select outputs of the microcomputer chip, and setting at least one external bus of the computer to a low power state;

(f) switching the frequency of the main clock signal to the slow second frequency;

(g) turning off a fast oscillator circuit producing the fast first clock signal; and (h) determining when a power-up operation is needed by servicing an interrupt at the slow second frequency.

22. The method of claim 21 wherein executing the power saving routine includes turning on the fast oscillator circuit and switching the frequency of the main clock signal back to the fast first frequency.

23. The method of claim 22 including determining if a slow memory device is coupled to or in the microcomputer and, if so, then dividing the fast first clock signal down to produce a lower frequency third clock signal having a third frequency and clocking circuitry of at least a portion of the microcomputer chip at the third frequency in response to the third clock signal.

24. The method of claim 23 wherein executing the power saving routine includes enabling the slow memory device at the third frequency and also switching the frequency of the main clock signal to the fast first frequency.

25. The method of claim 22 wherein the deselect signals of step (2) disable all external memory devices coupled to the microcomputer chip.

26. The method of claim 21 wherein executing the power saving routine includes turning off power to the first I/O port.

27. The method of claim 21 wherein step (b) includes setting a timer in response to a keystroke and determining that the low power standby operation is needed if the timer times out.

* * * * *